(12) United States Patent
Chern et al.

(10) Patent No.: US 10,882,297 B2
(45) Date of Patent: *Jan. 5, 2021

(54) APPARATUS AND TAB-FORMING PROCESS FOR ADHESIVE BACKED PRODUCTS

(71) Applicant: The Tabbit, LLC, Buffalo Grove, IL (US)

(72) Inventors: Jerry Chern, Buffalo Grove, IL (US); Detlef Schmidt, Deer Park, IL (US)

(73) Assignees: Jerry Chern, Buffalo Grove, IL (US); Detlef Schmidt, Deer Park, IL (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/143,186

(22) Filed: Apr. 29, 2016

(65) Prior Publication Data

US 2016/0243810 A1    Aug. 25, 2016

Related U.S. Application Data

(63) Continuation-in-part of application No. 14/496,170, filed on Sep. 25, 2014, now Pat. No. 9,327,935.

(60) Provisional application No. 61/883,227, filed on Sep. 27, 2013.

(51) Int. Cl.
| | |
|---|---|
| B32B 38/18 | (2006.01) |
| B32B 37/12 | (2006.01) |
| B32B 37/02 | (2006.01) |
| B32B 38/00 | (2006.01) |
| B65H 35/00 | (2006.01) |

(52) U.S. Cl.
CPC .............. *B32B 38/18* (2013.01); *B32B 37/02* (2013.01); *B32B 37/12* (2013.01); *B32B 38/0004* (2013.01); *B65H 35/0026* (2013.01); *B32B 2405/00* (2013.01); *Y10T 156/1051* (2015.01); *Y10T 225/297* (2015.04)

(58) Field of Classification Search
None
See application file for complete search history.

(56) References Cited

U.S. PATENT DOCUMENTS

| | | | | |
|---|---|---|---|---|
| 2,526,494 A | * | 10/1950 | McNeil ................. | B65H 37/06 225/25 |
| 3,265,264 A | * | 8/1966 | Stephens ............ | B65H 35/0026 225/25 |
| 4,634,415 A | * | 1/1987 | Knoop ............... | B65H 35/0026 267/164 |

(Continued)

FOREIGN PATENT DOCUMENTS

JP              09188468 A   *   7/1997   .........  B65H 35/0026

*Primary Examiner* — Barbara J Musser
(74) *Attorney, Agent, or Firm* — Scherrer Patent & Trademark Law, P.C.; Stephen T. Scherrer; Monique A. Morneault

(57) ABSTRACT

The present invention relates to apparatuses and processes for forming tabs on adhesive backed products. Specifically, the apparatus of the present invention provides a sequential series of mechanisms to form a tab on an adhesive-backed product, such as adhesive tape, so that the same may be easy to remove from an article at a later date. More specifically, the apparatus of the present invention provides a sequential series of mechanisms to form a tab that is formed solely of the adhesive-backed product itself, which may be utilized for the subsequent removal thereof after placement on an article.

28 Claims, 9 Drawing Sheets

(56) References Cited

U.S. PATENT DOCUMENTS 4,826,551 A * 5/1989 Ingram .................. B65B 51/06
156/185

* cited by examiner

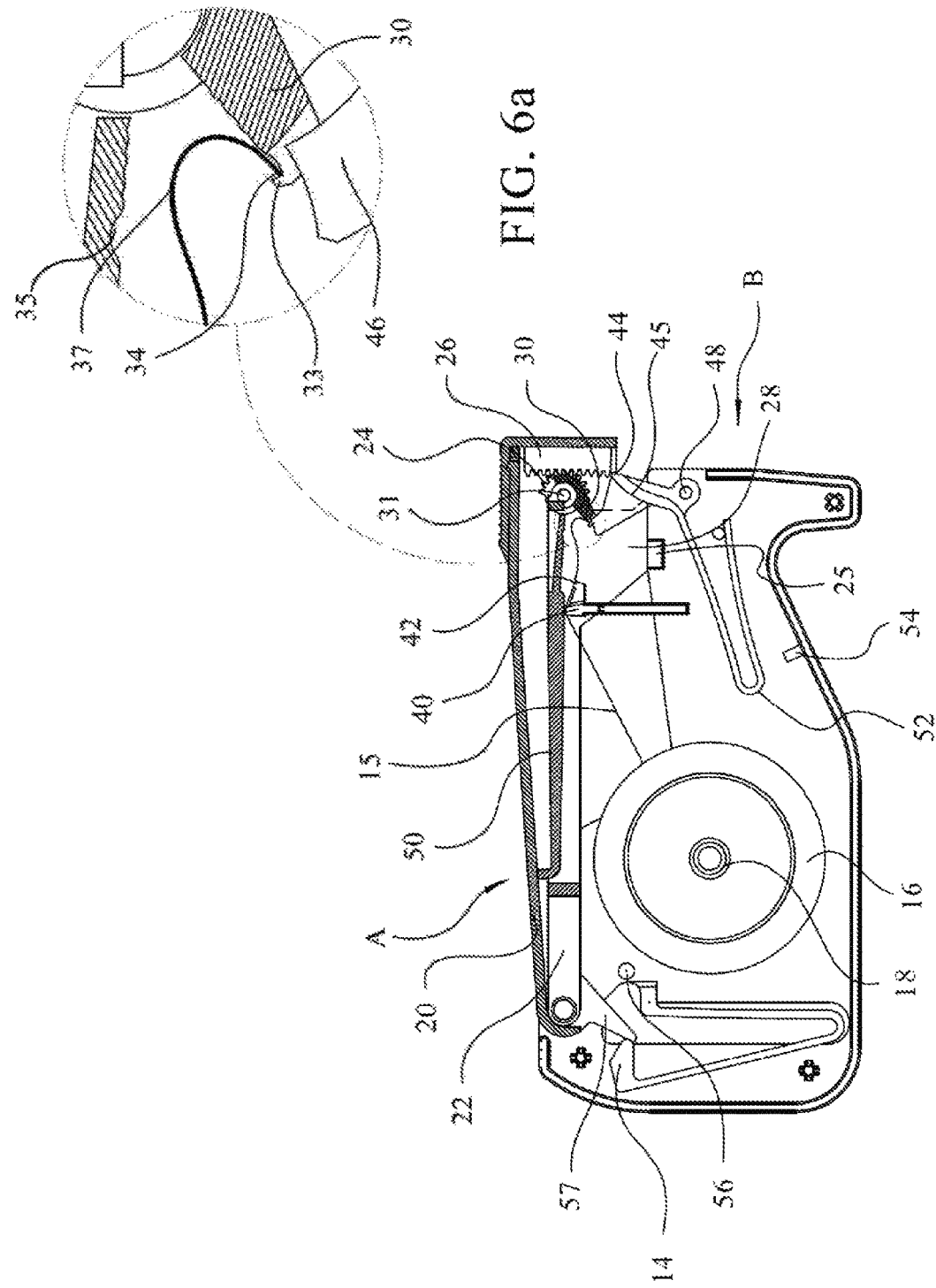

APPARATUS AND TAB-FORMING PROCESS FOR ADHESIVE BACKED PRODUCTS

The present invention claims priority to U.S. patent application Ser. No. 14/496,170 titled, "Apparatus and Tab Forming Process for Adhesive Backed Products", filed Sep. 25, 2014, now U.S. Pat. No. 9,327,935, which claims priority to U.S. Provisional Patent App. No. 61/883,227, titled "Apparatus and Tab-Forming Process for Adhesive Backed Products," filed Sep. 27, 2013, each of which is expressly incorporated herein in its entirety.

TECHNICAL FIELD

The present invention relates to an apparatus and process for forming tabs on adhesive-backed products. Specifically, the apparatus of the present invention provides a sequential series of mechanisms to form a tab on an edge of an adhesive-backed product, such as adhesive tape, so that the same may be easy to remove from an article at a later date.

BACKGROUND

Adhesive tape has been used for hundreds of years to bind articles together. Indeed, at the consumer level, in commerce, medicine, in industry, and in many other fields, tapes, labels and other adhesive-backed products are used daily. In many cases, the adhesive-backed product may be placed on an article to be removed at a future date. The difficulty in such removal is widely recognized, often requiring the use of a fingernail or other means to detach an edge of the substrate. Lost time, resulting in damage and frustration are the overwhelming result. Medical tape is a prime example, requiring placement of the tape on a patient's skin, on bandages, or on medical articles for use with a patient. However, the medical tape is typically removed when the bandage or medical article is removed. Removal thereof is often difficult, and typically requires an edge to be removed first, which may be difficult and result in frustration for the medical staff and discomfort for the patient.

While a tab at one margin of the adhesive-backed product would provide for easy future removal thereof, attempts to address this problem have not yet been fully successful. Approaches have included, among others, liquids applied to selectively neutralize the adhesive, mechanical folding devices that hazard getting stuck in the adhesive, and separate rolls of paper tabs to be applied to the product to form a non-sticking segment on the adhesive-backed product. A need, therefore, exists for an apparatus to create a tab on an adhesive-backed product that may be utilized for the removal thereof after placement on an article.

Moreover, a need exists for an apparatus and tab-forming process for adhesive-backed products that is simple and effective. Specifically, a need exists for an apparatus and tab-forming process for adhesive-backed products that consistently creates a tab on adhesive-backed products for easily grasping the same and removing the adhesive-backed products from articles adhered thereto. In addition, a need exists for an apparatus and tab-forming process for adhesive-backed products that forms a tab without adding material to the adhesive-backed products.

Further, a need exists for an apparatus and tab-forming process for adhesive-backed products that may be utilized with a plurality of types of adhesive-backed products, such as tapes, films, labels, and/or other like adhesive-backed products. Still further, a need exists for an apparatus and tab-forming process for adhesive-backed products that is easy to adjust for use with the plurality of types of adhesive-backed products.

In addition, a need exists for an apparatus and tab-forming process for adhesive-backed products having a tab-forming cycle that quickly forms a non-adhesive tab without binding the adhesive-backed product in the apparatus, and does not itself adhere to the adhesive disposed on the adhesive-backed products. Moreover, a need exists for an apparatus and tab-forming process for adhesive-backed products that may form a non-adhesive tab and allow a user to designate and choose a specific length of the adhesive-backed product for use thereof. Further, a need exists for an apparatus that can form a non-adhesive tab on adhesive-backed products, but also allows the user to choose to withdraw any length of tape with no tab at all.

SUMMARY OF THE INVENTION

The present invention relates to an apparatus and process for forming tabs on adhesive backed products. Specifically, the apparatus of the present invention provides a sequential series of mechanisms to form a tab on an adhesive-backed product, such as adhesive tape, so that the same may be easy to remove from an article at a later date.

To this end, in an embodiment of the present invention, an apparatus is provided for forming a tab on an adhesive-backed product, such as a length of tape, film, label, or other like adhesive-backed product. The apparatus may, through motions of a sequential series of coordinated mechanisms, cause a tab to be formed on an adhesive-backed product, facilitating its easy removal at a later date. The apparatus may comprise an upper assembly and a lower assembly hinged at one end, the lower assembly having a cutter at a second end thereof, and having a roll of tape housed near the hinge end and fed toward the cutter end of the lower assembly; a first anvil surface disposed in proximity to the cutter and an optional second anvil surface disposed in proximity to the cutter; and a folding assembly extending from the upper assembly to engage an end of tape fed toward the cutter, and forming a tab when engaged.

The apparatus may be adjusted and modified to accommodate not only the varying properties of different adhesive-backed products, substrates and adhesives, but may also be scaled up for industrial production. The product or substrate may be retrieved from a roll or fed from a flat stock by various means of delivery and mechanization. The coordinated parts of the apparatus work together to provide the proper placement and timing required to accommodate the tab-forming cycle.

The presently preferred embodiment, as disclosed herein, provides one of several possible iterations of the principles involved, and the invention is not intended to be limited as described herein. The apparatus of the present invention is shown and described in this embodiment as similar in size and shape to an office desk stapler. The process for forming a tab in an adhesive-backed product comprises a rapid cycle of coordinated moving parts. The results from the previous cycle will produce a new leading edge of the adhesive-backed product. In a preferred embodiment, the new leading edge may also be serrated. The new leading edge may lie across at least one horizontal plastic or metal member (anvil or holder or guide) on an adhesive side thereof, which may force the adhesive-backed product to be disposed forwardly into a relative position and height to force the adhesive-backed product to present its curved, leading edge at a specific angle. Upon beginning the cycle by pressing down on the apparatus' upper assembly, or otherwise initiating the mechanical sequence, a cam pushes the cutter out of the way, which breaks any possible adhesive strands that may have stuck to the cutter. This insures that the tape edge projects properly at the prescribed angle in preparation for capture and folding thereof. A folding assembly rotates downwardly from an upper assembly of the apparatus toward the tape edge, and a small, roughly right-angled extension or lip protruding upwardly from the folding hinge's leading edge securely captures the tape edge while the completed rotation of the folding assembly folds and forms a tab by folding and adhering a segment of the adhesive-backed product to itself. The apparatus may automatically be restored to its starting position by a return spring near the main hinge or by gravity if so configured.

It is, therefore, an advantage and objective of the present invention to provide an apparatus to create a tab on an adhesive-backed product that may be utilized for the removal thereof after placement on an article.

Moreover, it is an advantage and objective of the present invention to provide an apparatus and tab-forming process for adhesive-backed products that is simple and effective.

Specifically, it is an advantage and objective of the present invention to provide an apparatus and tab-forming process for adhesive-backed products that consistently creates a tab on adhesive-backed products for easily grasping the same and removing the adhesive-backed products from articles adhered thereto.

In addition, it is an advantage and objective of the present invention to provide an apparatus and tab-forming process for adhesive-backed products that forms the tab without adding material to the adhesive-backed products. Specifically, it is an advantage and objective of the present invention to provide an apparatus and tab-forming process for adhesive-backed products that creates a tab on the adhesive-backed products that is formed solely of the adhesive-backed product itself.

Further, it is an advantage and objective of the present invention to provide an apparatus and tab-forming process for adhesive-backed products that may be utilized with a plurality of types and sizes of adhesive-backed products, such as tapes, films, labels, and/or other like adhesive-backed products.

Still further, it is an advantage and objective of the present invention to provide an apparatus and tab-forming process for adhesive-backed products, the design of which is easy to adjust for use with a plurality of types of adhesive-backed products.

In addition, it is an advantage and objective of the present invention to provide an apparatus and tab-forming process for adhesive-backed products having a tab-forming cycle that quickly forms a non-adhesive tab without allowing the binding of the adhesive to the apparatus in a way that would impede or prevent its proper function.

Moreover, it is an advantage and objective of the present invention to provide an apparatus and tab-forming process for adhesive-backed products that may form a non-adhesive tab and allow a user to designate and choose a specific length of the adhesive-backed product for use thereof.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 illustrates a further cross-sectional side view of a tab-forming apparatus for adhesive-backed products wherein an adhesive-backed product has been partially folded in an embodiment of the present invention.

FIG. 6a illustrates a close-up side view of a capture lip engaging an adhesive-backed product causing the adhesive-backed product to bend in an embodiment of the present invention.

DETAILED DESCRIPTION OF THE PRESENTLY PREFERRED EMBODIMENTS

The present invention relates to apparatuses and processes for forming tabs on adhesive backed products. Specifically, the apparatus of the present invention provides a sequential series of mechanisms to form a tab on an adhesive-backed product, such as adhesive tape, so that the same may be easy to remove from an article at a later date.

The adhesive-backed product may be, but is not limited to, tapes, films and labels. The principles and functionality of the present invention are demonstrated in the preferred embodiments, provided herein in FIGS. 1-9.

Figure 1:
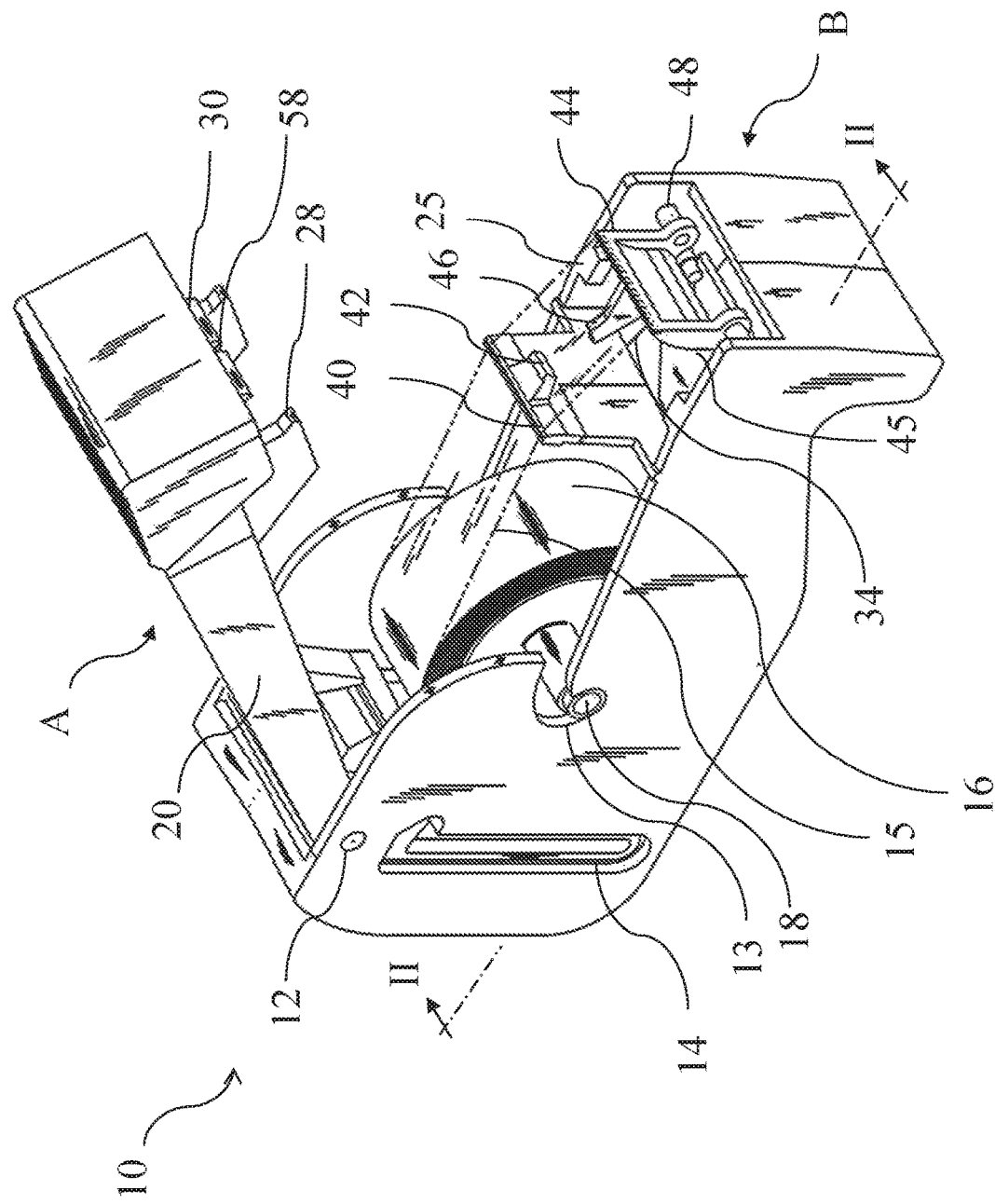
FIG. 1 illustrates a perspective view of a tab-forming apparatus for adhesive-backed products in an embodiment of the present invention.
Figure 2:
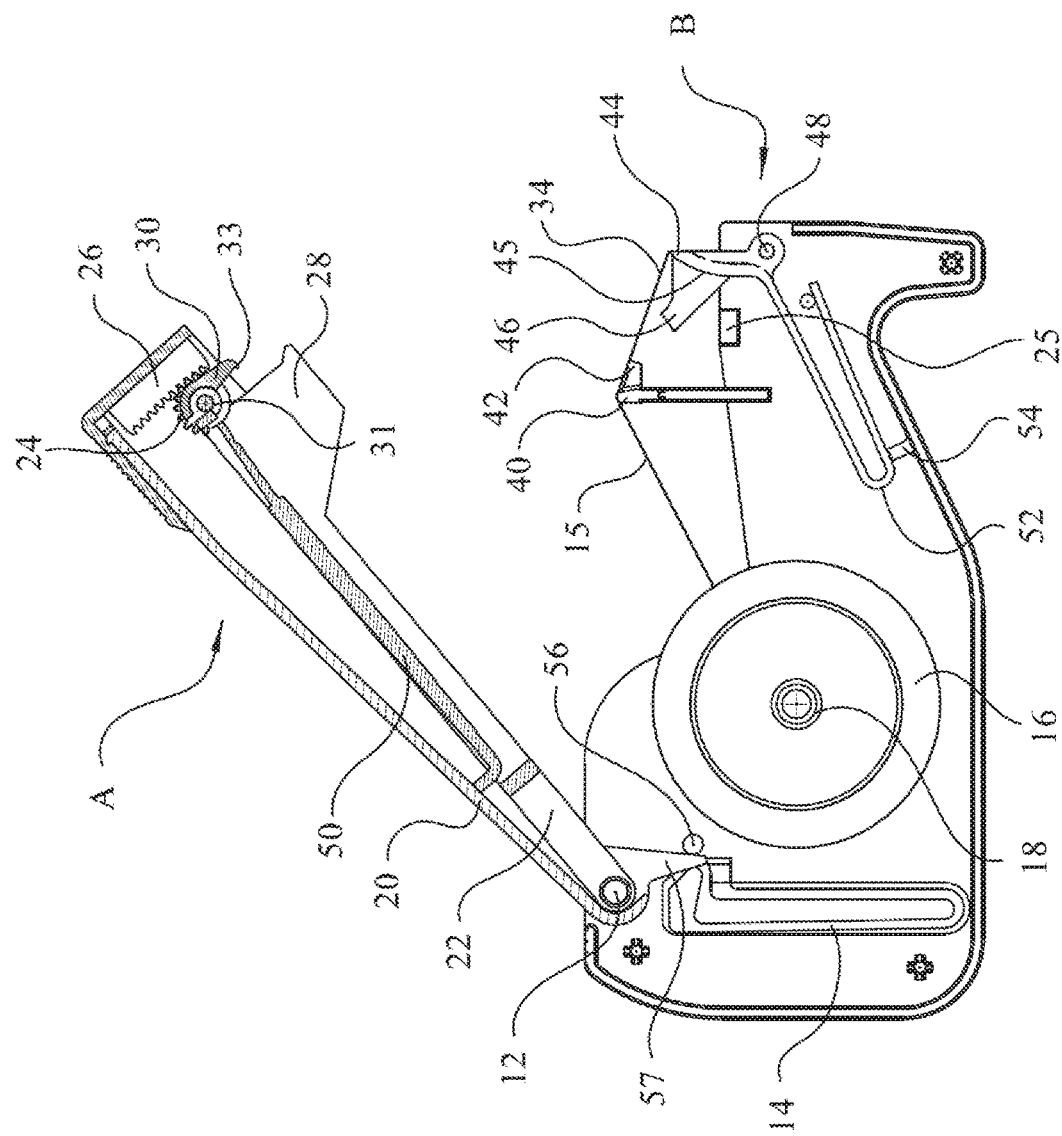
FIG. 2 illustrates a cross-sectional side view of a tab-forming apparatus for adhesive-backed products in an embodiment of the present invention.

A tab forming and cutting apparatus 10 of the present invention is illustrated in FIG. 1 and comprises a top half having a folding assembly A, also known as an upper assembly or a tape folding assembly, and a lower half having a tape and cutter assembly B, also known as a base housing. The top folding assembly A and the tape and cutter assembly B may be joined on one end by a main hinge 12 that may allow the top folding assembly A and the tape and cutter assembly B to move relative to each other, with the top folding assembly A moving toward and away from the cutter assembly B via the main hinge 12. Preferably, the top folding assembly A and the cutter assembly B may be positioned about 40 degrees relative to each other from main hinge 12, although the present invention should not be limited as described herein nor limited to a rotary motion as described above. The main hinge 12 may have a cam 57, as illustrated in FIG. 2, to engage a spring 14, such as a leaf spring or any other spring, that biases the top folding assembly A away from the tape and cutter assembly B, such that when in use, a user may push down on the top folding assembly A to engage the folding mechanisms described herein and the spring 14 may bias the top folding assembly A away from the tape and cutter assembly B when folding is complete, as described below. A stop 56 may be utilized for stopping the top folding assembly A when biased away from the tape and cutter assembly B to prevent overextension of the top folding assembly A. Each half may have separate moving parts that may contribute to the full cycle of tab formation, as described herein.

Near the main hinge 12 of the apparatus may be a tape roll holder slot 13 that may hold a tape roll 16, which may be secured therein by a removable tape roll hub 18. Tape, or other adhesive-backed film, label, or other product may be pulled from the tape roll 16 or other tape supply feeder device that may be housed in the tape roll holder slot 13 or other tape supply feeder device for use within the tab-forming apparatus 10.

The folding assembly A may have an essential upper arm 20 and a lower arm 22 that may be hinged together rearwardly at main hinge 12, as illustrated in FIG. 2, wherein the lower arm 22 may move relative to the upper arm 20 via interaction between a folding hinge pinion gear 24, rotatably attached to the lower arm 22, and a pinion actuator gear 26, which may be attached to the inside of the upper arm 20, as illustrated in FIG. 2. It should be noted that the use of the term "arm" is used throughout the specification, but may include any structure capable of fulfilling the function described therein, without having the appearance of an "arm". Cutter displacement cam 28 may further protrude downwardly from the lower arm 22, and engagement of the cutter displacement cam 28 to the tape and cutter assembly B (as described below) may push the lower arm 22 upwardly inside upper arm 20. At that time, folding hinge pinion gear 24 may travel along pinion actuator gear 26, causing a folding hinge 30 to rotate along an axis of rotation at folding hinge pin 31, causing the folding hinge 30 to rotate and fold rearwardly, or clockwise in FIG. 2. The folding hinge 30 may engage a tape edge 34 to fold the same, when engaged, as described in more detail below.

The tape and cutter assembly B may further include a tape anvil 40 and an optional tape guide anvil 42, disposed adjacent or otherwise in proximity to each other, each of which may engage the adhesive side of the adhesive tape disposed thereon, and operate in concert to position the tape edge 34 in such a manner as to be engaged by the folding hinge 30, forming the tab therein, as described below. It should be noted that a single tape anvil (as opposed to the two described herein), or more than two anvils or other guides may be utilized to prepare the tape edge 34 for tab-forming, as described herein, and the invention should not be limited as described herein.

The tape and cutter assembly B may further comprise a cutter 44 for cutting the tape, such as a flat blade, a serrated blade, or other like cutting means. At the user's discretion, a length of tape may be pulled from the tape roll 16 and may be cut using the cutter 44 without cycling the device to form a tab, as would be normal in a typical tape dispenser, such as a typical Scotch® tape dispenser. Alternatively and preferably, and as described herein in more detail below, a tab may be formed in the tape edge 34 and a user may then grasp the tape edge 34, pull from the tape roll 16 a desired length of tape, and cut the same using the cutter 44. A tape positioning finger 46 may extend rearwardly from the cutter 44 to help further guide the tape and position the same for tab-forming, as described herein.

In addition, the tape and cutter assembly B may have a cutter cam receiver surface 45 which may engage the cutter displacement cam 28 protruding from the lower arm 22, pushing the cutter 44 out of the way during the tab-forming process, as described in more detail below. A cutter cam stop 25 may be used stop the cutter displacement cam 28, when the same is pushed downwardly, which may thereby push the lower arm 22 upwardly toward the upper arm 20, causing the folding hinge 30 to fold and form the tab in the tape edge 34, as described herein.

Figures 7, 7A:
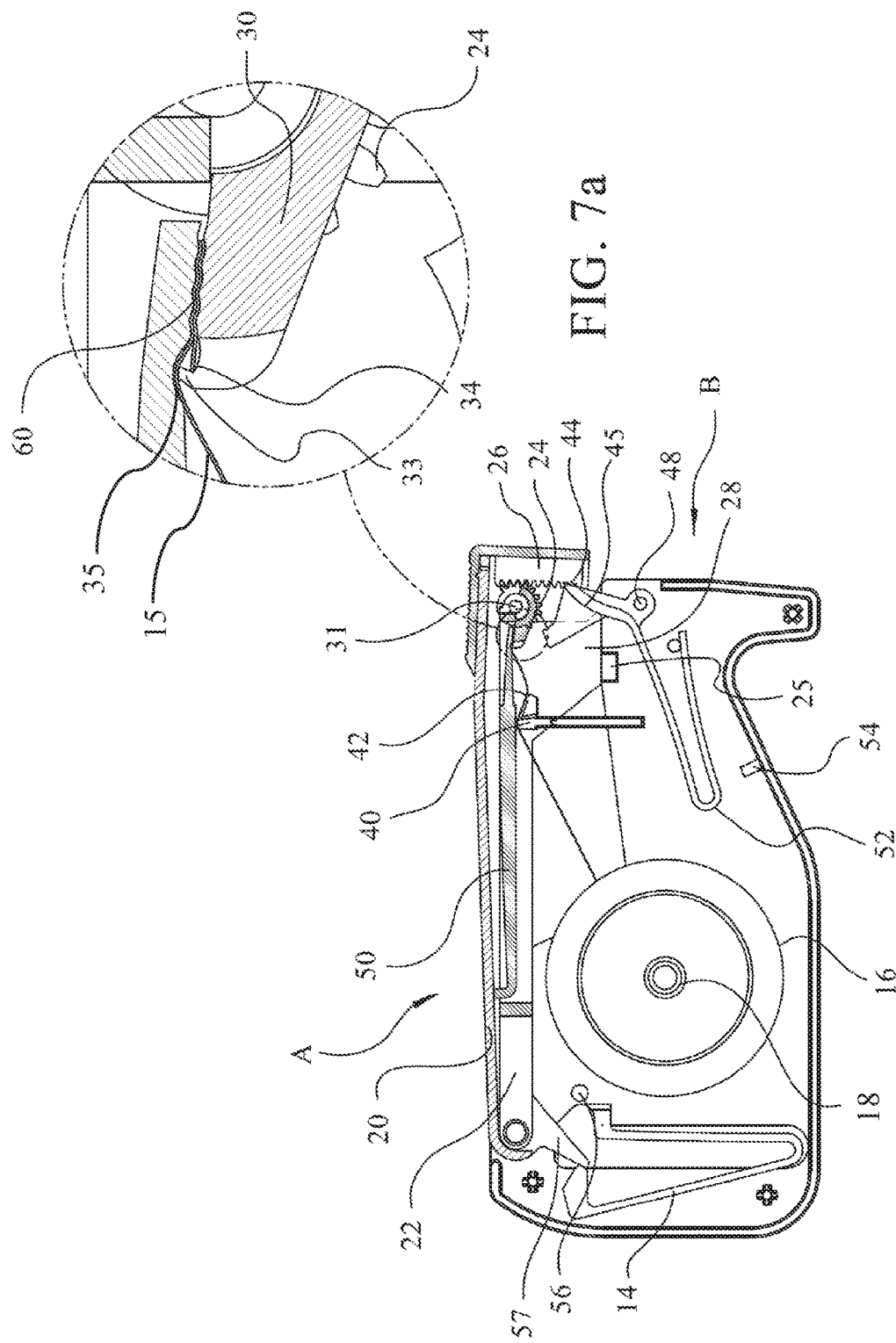
FIG. 7 illustrates a further cross-sectional side view of a tab-forming apparatus for adhesive-backed products wherein an adhesive-backed product has been completely folded to form a tab in an embodiment of the present invention.
FIG. 7a illustrates a close-up side view of a capture lip pressing an adhesive-backed product against a mating surface on a leaf spring or other opposing surface causing the adhesive-backed product to fold and form a tab in an embodiment of the present invention.
Figure 8:
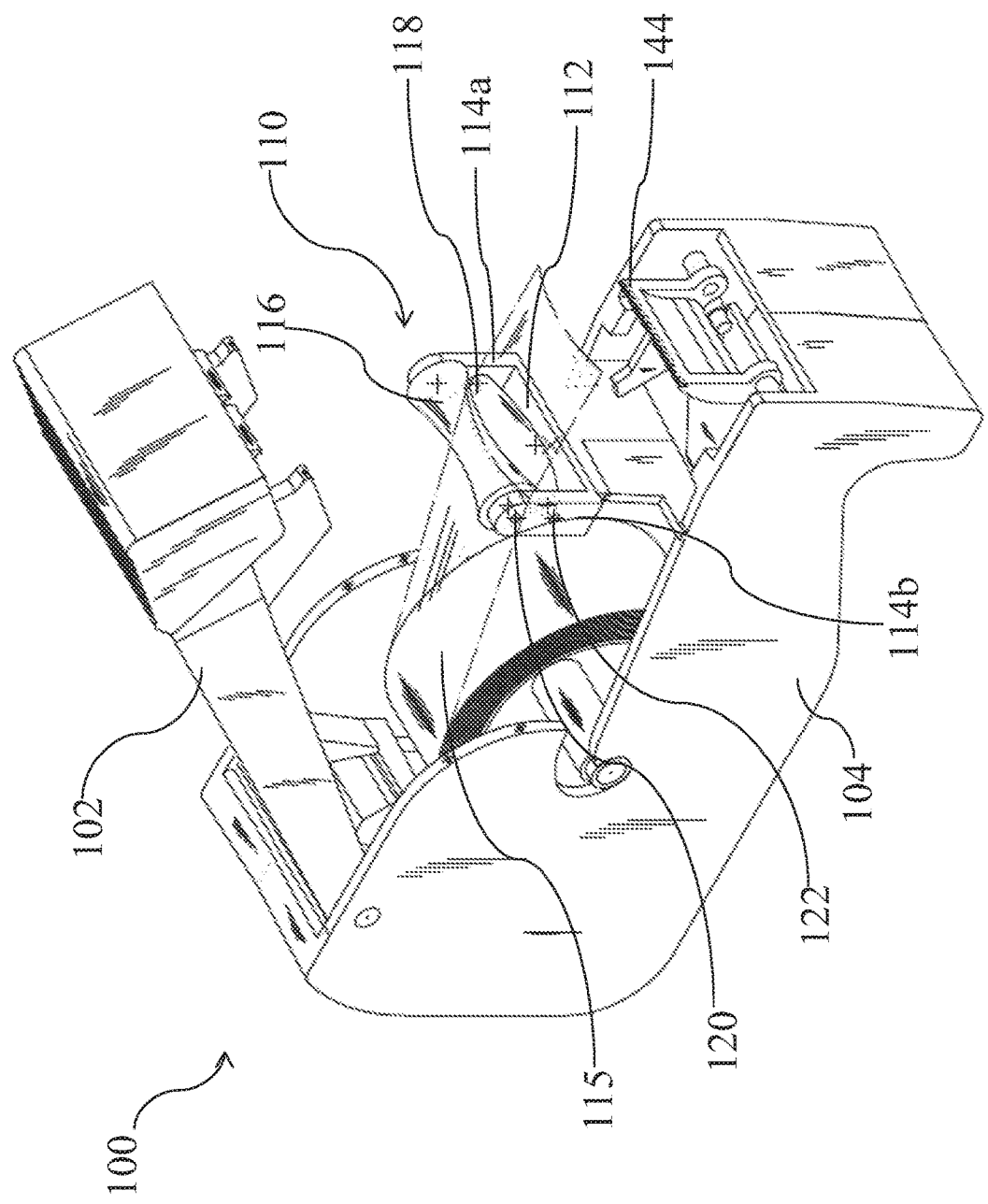
FIG. 8 illustrates a perspective view of a tab-forming apparatus for adhesive-backed adhesive-backed products in an alternate embodiment of the present invention.

In an alternate embodiment disclosed in FIG. 8, tab-forming and cutting apparatus 100 is illustrated, and described herein. Specifically, tab-forming and cutting apparatus 100 may be nearly identical to the tab-forming and cutting apparatus 10, disclosed above. However, replacing tape anvil 40 and the tape anvil guide 42, as shown in FIGS. 1-7, may be a roller guide mechanism 110 comprising a support bridge 112 comprising two vertical posts 114a, 114b disposed in roughly the same or a similar location as the tape anvil 40 and tape anvil guide 42, as described above. The support bridge 112 may have a first roller 116 and a second roller 118 supported by the vertical posts 114a, 114b of the support bridge 112. The first roller 116 may sit atop the second roller 118, each of which may rotate along axes 120, 122, respectively.

As described in more detail below, it is preferred that the leading edge of the tape 115 have a curve that is downward from the center of the tape 115 to the outside edges thereof, hereinafter referred to as a "lateral downward curve" of the tape. The lateral downward curve of the tape 115 imposes beam strength, and thereby aids in engagement with the folding mechanism, as described below, allowing for a consistent fold on the leading edge of the tape 115 to form the tab.

To ensure that the leading edge of the tape 115 consistently includes the downward curve, the first roller 116 may have a concave cylindrical shape, while the second roller 118 may have a convex cylindrical shape. The convex shape of the second roller 118 may fit together with and under the concave shape of the first roller 116 when the two are disposed one atop the other. Spacing of first roller 116 and the second roller 118 may allow the tape 115 to be pulled therethrough by a user of the same. Specifically, a user may grasp the leading edge of the tape 115 and pull the tape 115 through the gap between the first roller 116 and the second roller 118. Because the first or upper roller 116 is concave-shaped and the second or lower roller 118 is convex-shaped, the tape 115 may adopt the downward curve, introduced by the first roller 116 and the second roller 118 as the tape 115 pass therebetween.

The first roller 116 and the second roller 118 may be made of any material that may allow the tape 115 to pass therethrough. Because the underside of the tape 115 may have adhesive thereon, the second roller 118, which may contact the adhesive of the tape 115, may include means for aiding in the release of the tape 115 from the second roller 118. Specifically, the first and/or second rollers 116, 118 may contain corrugations, grooves or points that may decrease the surface area of the rollers 116, 118 that may contact the tape 115 and thereby reduce the contact area of and adherence to the first and/or second rollers 116, 118 to the tape 115. Alternatively or in addition, the first and/or second rollers 116, 118 may contain an adhesive-releasable material so that the adhesive does not adhere to the second roller 118. For example, the second roller 118 may include a silicone material or other material that is known not to readily or permanently adhere to the adhesive on the underside of the tape 115.

Once the tape 115 is pulled through the first roller 116 and the second roller 118, it may be cut using the cutter 144, and a tab may be imparted into the edge of the tape 115 using the tab-forming mechanism described herein.

It should be noted that the position of the roller guide mechanism 110 near the cutting mechanism 144 may be changed, depending on how much space is necessary to incorporate the concave-downward curve in the tape 115 prior to forming the tab therein.

Figure 9:
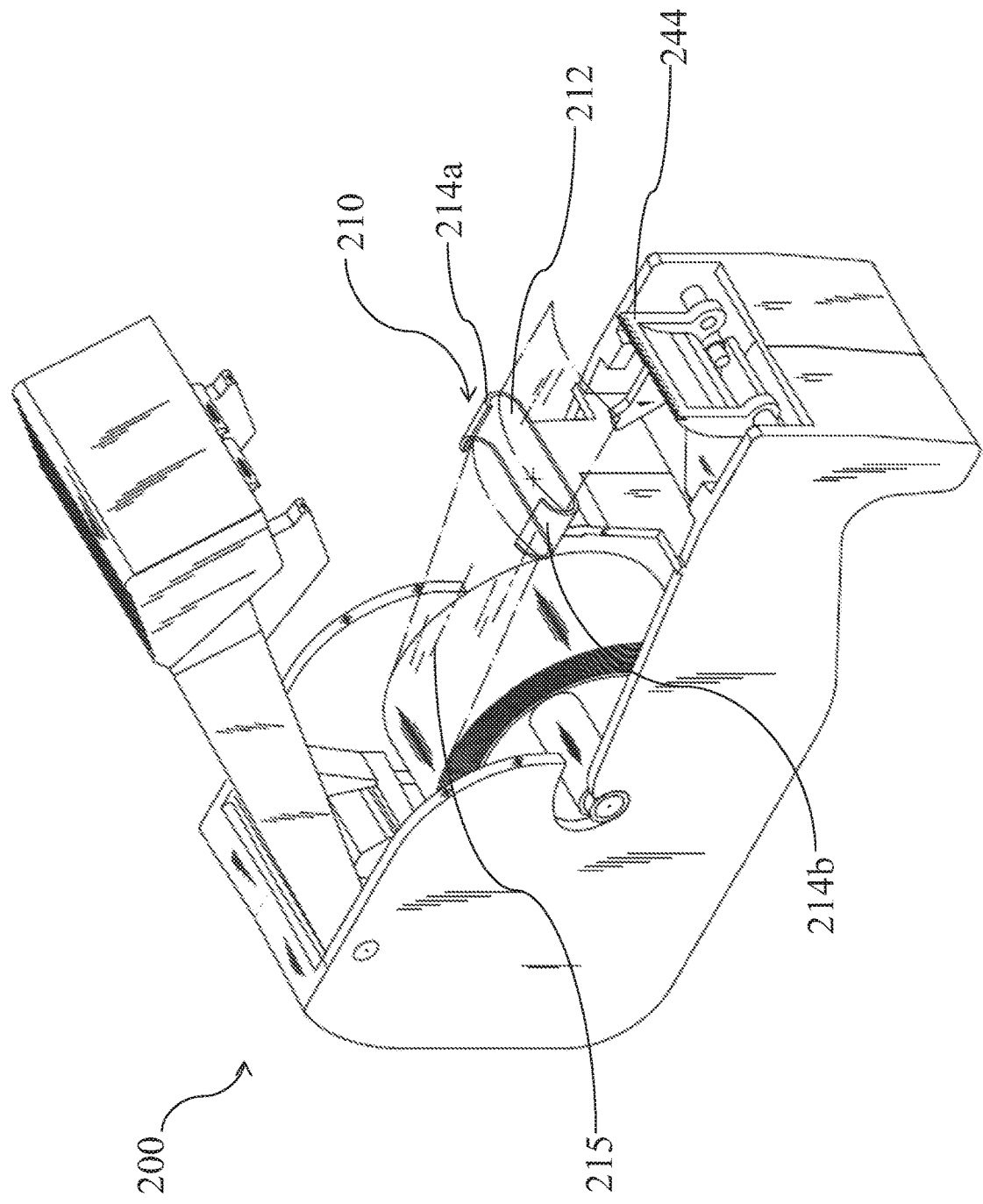
FIG. 9 illustrates a perspective view of a tab-forming apparatus for adhesive-backed products in yet another alternate embodiment of the present invention.

In an alternate embodiment of the present invention, disclosed in FIG. 9, tab-forming and cutting apparatus 200 is illustrated, and described herein. Specifically, tab-forming and cutting apparatus 200 may be nearly identical to the tab-forming and cutting apparatus 10, disclosed above. However, replacing tape anvil 40 and the tape anvil guide 42, as shown in FIGS. 1-7, may be a tape guide 210 comprising a base 212, a first curved side 214a and a second opposing curved side 214b, wherein the first curved side 214a and the second curved side 214b are on opposite sides of the base 212, which may be disposed laterally across the direction of travel of the tape 215. The tape guide 210 may be disposed in roughly the same or a similar location as the tape anvil 40 and tape anvil guide 42, as described above with respect to FIGS. 1-7, or the tape roller guide 110, as described above with respect to FIG. 8.

The tape guide 210 may introduce a concave-downward curve into the tape 215 when the tape 215 is disposed within the tape guide 210. Specifically, the first curved side 214a and the second curved side 214b squeeze the tape 215 laterally because the distance between the first curved side 214a and the second curved side 214b of the tape support guide 210 may be narrower than the lateral width of the tape 215. The base 212 may be relatively straight (or may be convexly curved to aid in the introduction of the lateral concave-downward curve of the tape 215, while a space above the base between the first curved side 214a and the second curved side 214b may allow the tape to curve concave-downwardly laterally from the center of the tape 215 to the tape's outer edges and may allow the tape to move freely through the tape guide 210 toward the folding mechanism.

Once the tape 215 is pulled through the tape guide 212, it may be cut using the cutter 244, and a tab may be imparted into the edge of the tape 215 using the tab-forming mechanism described herein.

Moreover, it should be noted that the position of the tape guide 210 near cutting mechanism 244 may be changed, depending on how much space is necessary to incorporate the lateral concave-downward curve and resulting beam strength in the tape 215 prior to forming the tab therein.

The component parts of each half, their specific functions and their sequences of enlistment are enumerated in the following sections. Their configuration relative to one another may vary while not altering the subject mechanisms resulting function.

Materials

The parts of the preferred embodiment, as illustrated herein, may be made from metals and/or plastic, preferably aluminum and/or resilient thermoplastic, springs may be made of spring steel or bendable plastic (if in the form of leaf springs or other like parts), and the cutter 44 may be made from metal or plastic. Although the present invention is described with reference to preferred materials, it should be noted that any materials may be used for the apparatus herein, as apparent to one of ordinary skill in the art.

Products to be Tabbed

While the invention may provide its tab-forming function on a variety of adhesive-backed substrates, the present invention may be utilized preferably, but not exclusively, with tapes, films and/or labels, or other like adhesive-backed products. The description provided with respect to the presently preferred embodiment demonstrates use of the apparatus with a roll of transparent tape most commonly found in homes and offices. The present invention, however, should not be limited as described herein.

The "Cycle"

Whether achieved on a large manufacturing platform with flat goods or on a small single-user apparatus using rolled goods, as in the presently preferred embodiment described herein, the formation of a tab on the adhesive-backed product's edge is the principle, purpose and function of the present invention. A single completed sequence of mechanical motions in the formation of the tab is referred to as "the cycle."

Assessment of the Substrate

All adhesive-backed products typically have a particular substrate or backing composition and adhesive properties. Substrates may include, but are not limited to, paper, plastic, film, cloth, vinyl, metal, foil, or other like substrates. The particular product disclosed herein may be an adhesive-backed strip, such as a pressure-sensitive office tape with a transparent film backing and an acrylic or synthetic rubber-based adhesive. However, it should be noted that while the present invention describes this preferred embodiment, the present invention should not be limited as described herein. Whether gathering data from the manufacturer or through experimental testing, determining the tape's properties may be an important element of the present invention. Generally, if a particular tape is too flexible after passing over the anvils, thereby drooping, or is too rigid and resists forming the curve perpendicular to its length that would provide beam strength, or any other desired result, the tape may not function with the apparatus as designed. Therefore, tensile strength, rigidity, flexibility, natural lateral downward curve, temperature sensitivity and other aspects of the substrate's nature may be required to be recognized for proper usage thereof.

Preparation for Formation of the Tab

The first step in the cycle may begin with the previous cutting and detachment of the tape. An important part of the principle that makes the tab-forming process possible may be the way that the tape edge 34 may be presented for folding into a tab. At the end of each cycle, for the segment of tape to be torn off by the cutter 44, as illustrated in FIG. 2, a cross-sectional side view of a tab-forming apparatus in an embodiment of the present invention, the tape 15 may be stretched over the blade edge of the cutter 44, as would be the case in typical roll dispensers.

As illustrated herein with respect to the tab-forming and cutting apparatus 10, as shown in FIGS. 1-7 and described above, to be cut, the tape may be pulled over and above one or more members, the tape anvil 40, optionally, the tape guide anvil 42, optionally, the tape positioning finger 46, as illustrated in FIG. 2, the tape roller guide 110 in FIG. 1 or the tape guide 210 in FIG. 9, to reach the cutter 44, as illustrated in FIG. 2. The tape's adhesive underside may stick to each of the tape anvil 40 and the tape guide anvil 42 at the point of contact thereto. As a result, the tape anvil 40 may raise the tape higher than its plane of supply and the tape guide anvil 42 may further position the tape at a precise angle that may cause the cut tape edge 34 to be suspended adjacent to the cutter 44 where its exact position may present it for capture and folding by the folding assembly A, as illustrated in FIGS. 3-7. The tape anvil's 40 minor dimension (thickness) may optionally bear a radius or rounding at its top. This may provide two important functions: 1) it may avoid the sharp edges that may otherwise abrade or undesirably cut the tape; and 2) the tape may more positively stick to the rounded top edge of the first tape anvil 40 for better control, form and positioning.

The tape's properties may be considered important for ideal presentation of the tape for capture and folding, as described herein. The tape guide anvil 42 may be narrower than the tape anvil 40 to help facilitate a curving, or concave-down, radius in the tape edge 34. This may give the last segment of the tape (between the tape guide anvil 42 and the cutter 44) the necessary length as well as the beam or column strength, which not only assures a stiff and reliable angle of projection, but may give the tape edge's corners a slight downward curve, which may facilitate its later capture and folding, as described herein.

Optionally, as noted above in an embodiment, depending upon the substrate used, the tape anvil 40 may be provided with a longitudinal (widthwise) convex-up radius to further assure that the tape edge 34 corners curve downwardly. Other configurations of geometry may also result in the desired function of tab-forming. This curving, or forming of a concave-down shape of the tape may result from the combined geometry of the tape anvil 40 and the tape guide anvil 42. Giving the tape anvil 40 a toroidal or other geometrically-desirable shape may force the tape to curve when positioned in concert with the tape guide anvil 42. Further, in an alternate embodiment, a single anvil or guide 40 may provide the tape with the necessary concave-down curve.

As noted above with respect to FIGS. 8 and 9, alternate embodiments of the present invention may include a roller guide mechanism 110 or a tape guide 210 that may impart the downward curve in the leading edge of the tape 115, 215, respectively. For those substrates that are rigid, no curvature need be imposed; the guide's purpose being only that of directing the substrate's movement toward the cutter and folding mechanism.

Cutter Movement

Figure 3:
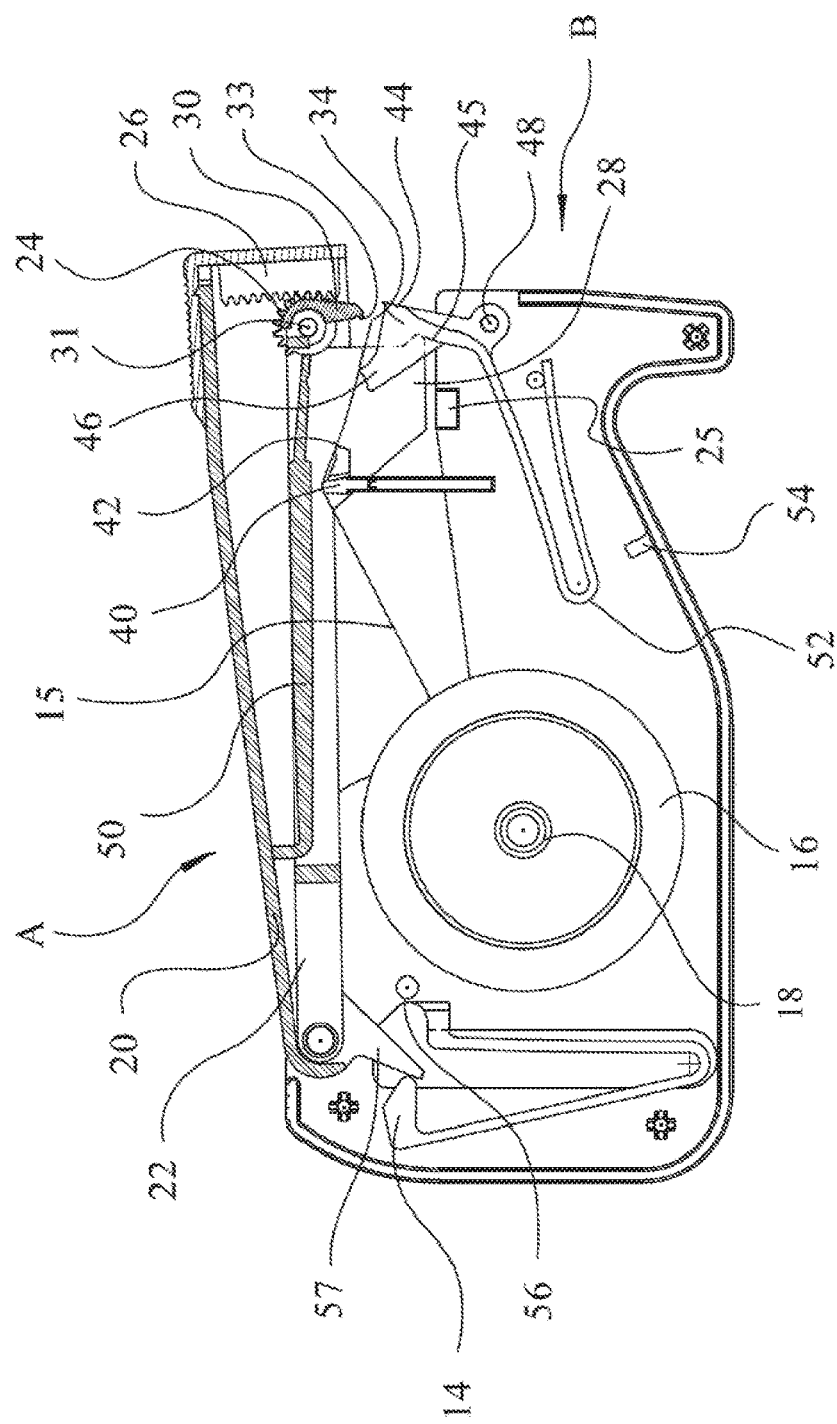
FIG. 3 illustrates a cross-sectional side view of a partially closed tab-forming apparatus for adhesive-backed products in an embodiment of the present invention.

In an embodiment of the present invention, the cutter 44 may preferably move down and/or away from the tape edge 34 before tab folding. This may help avoid two issues. First, any of the previously cut tape edge's 34 undesirable adhesive strands may be completely separated from the cutter 44. Second, the tape edge 34 may be free to conform to the precise angle and projection for the next capture and tab-forming. Thus, the cutter 44 may be mechanized to move out of the way during the tab-forming process by the cutter displacement cam 28 engaging the cutter cam receiver surface 45, and sliding down the angled face thereof, as illustrated in FIG. 3, and as described below. It should be noted that the description of the cutting mechanism herein refers to cutter 44, but would be similar, if not the same, as the cutter 144 or cutter 244, as illustrated in FIGS. 8 and 9, respectively, and reference to cutter 44 is also applicable to cutter 144 and cutter 244. Likewise, the various components described hereinbelow for "capturing" the leading edge of the tape and tab-forming refer primarily to FIGS. 1-7 and tab-forming and cutting apparatus 10, but are also applicable to tab-forming and cutting apparatuses 100 and 200, described above with reference to FIGS. 8 and 9.

Figure 4:
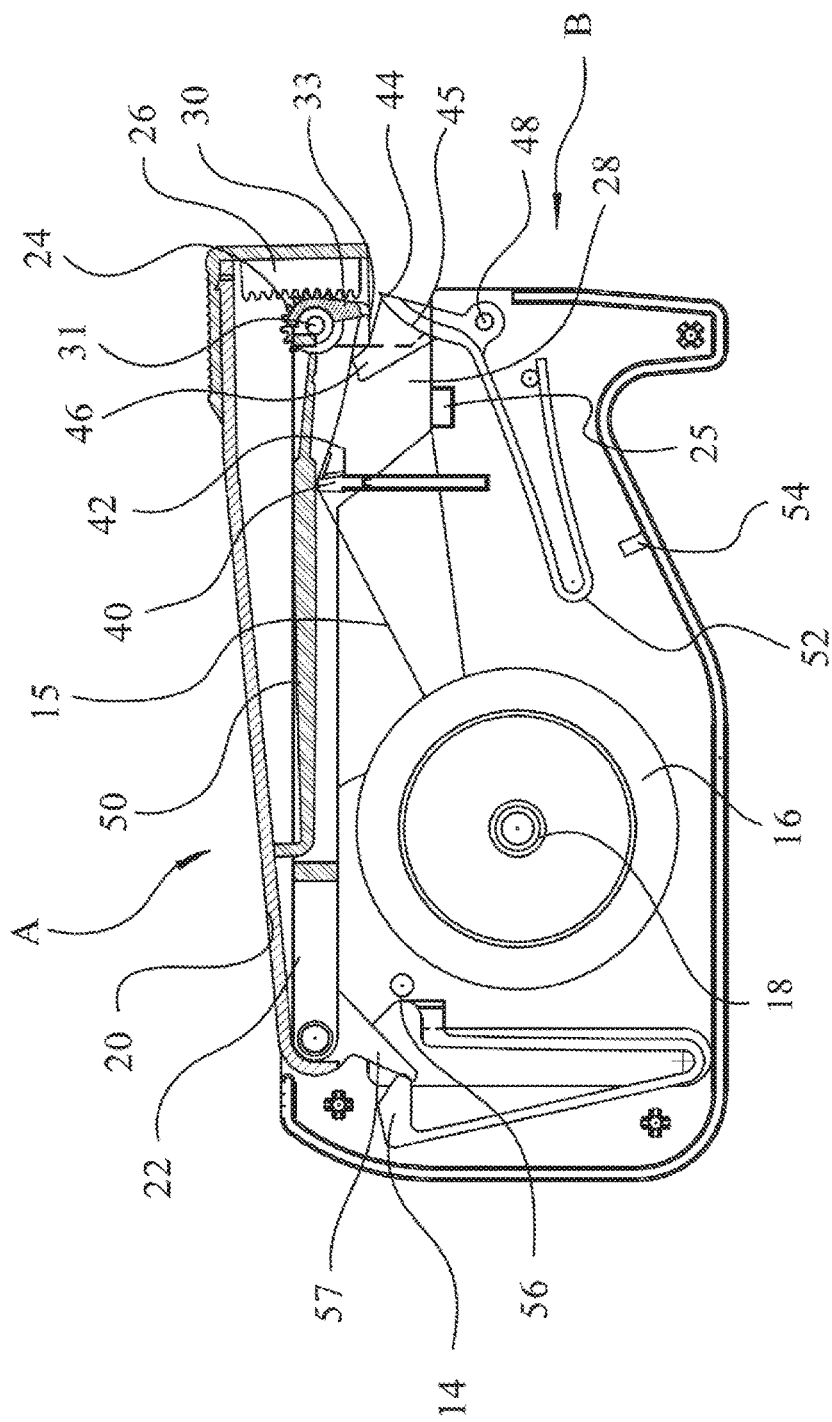
FIG. 4 illustrates a further cross-sectional side view of a tab-forming apparatus for adhesive-backed products wherein an adhesive-backed product is engaged by a folding assembly in an embodiment of the present invention.

In a preferred embodiment, when the folding assembly A and the tape and cutter assembly B begin to close upon themselves via a user pushing down on the apparatus, the cycle's first mechanical motion may be for the cutter displacement cam 28 to impinge upon the cutter cam receiver surface 45, which may push the cutter 44 out of the way and release the tape edge 34 to its intended position, as illustrated in FIG. 3. The cutter's rotation outward is about a cutter pivot pin 48, which may provide an axis of rotation for the cutter 44, as illustrated in FIGS. 3 and 4. An alternative configuration may provide for the cutter 44 to remain stationary throughout the cycle, while the return of the folding assembly A from the fold position to its initial start position may cause an anvil or guide to rise, causing the withdrawal of the tape edge 34 from the cutter 44, thereby severing any undesirable adhesive strands.

Capture

As described above, the folding assembly A may have the upper arm 20 and the lower arm 22 that may be hinged together, as described above. In addition, the lower arm 22 may be biased away from the upper arm 20 via one or more springs, such as leaf spring 50.

The cutter 44 may be attached to a cutter leaf spring 52 that may bias the cutter 44 into a cutting position when the cutter displacement cam 28 disengages from the cutter cam receiver surface 45. After disengagement of the cutter displacement cam 28 from the cutter cam receiver surface 45, the cutter leaf spring 52 may bias the cutter 44 back into the cutting position, the positioning aided by a cutter leaf spring stop 54.

The force to cycle the device may continue from downward pressure, but the cutter cam stop 25, which is attached to lower arm assembly 22 may be used to prevent further downward movement of both the upper arm 20 and the lower arm 22 of the folding assembly A. After the cutter displacement cam 28 has moved the cutter 44 out of the way and has hit the cutter cam stop 25, and the user is continuing to put downward pressure on the top of the apparatus, the upper arm 20 may not have bottomed out like the lower arm 22 may have. As the bias of the tape folding leaf spring 50 separating the upper arm 20 and the lower arm 22 at its second end is overcome, the two commence to close against each other on their hinge 12. The pinion actuator gear 26, which may have the shape of an internal ring gear segment having a slight radius, may be securely fixed to the upper arm 20, as illustrated in FIGS. 1 and 2. As the upper arm 20 is forced to close against the lower arm 22, the pinion actuator gear 26 may move downwardly against a folding hinge pinion gear 24, which may be mounted to the lower arm 22, causing the folding hinge pinion gear 24 to rotate (clockwise, as illustrated in FIGS. 3-7). The axis of the folding hinge pinion gear 24 is, therefore, a folding hinge pin 31, which may also be the axis of rotation for the folding hinge 30, as illustrated in FIGS. 2-7. The folding hinge pin 31 may also be incorporated into the body of the folding hinge 30 as an integral part.

Figure 5:
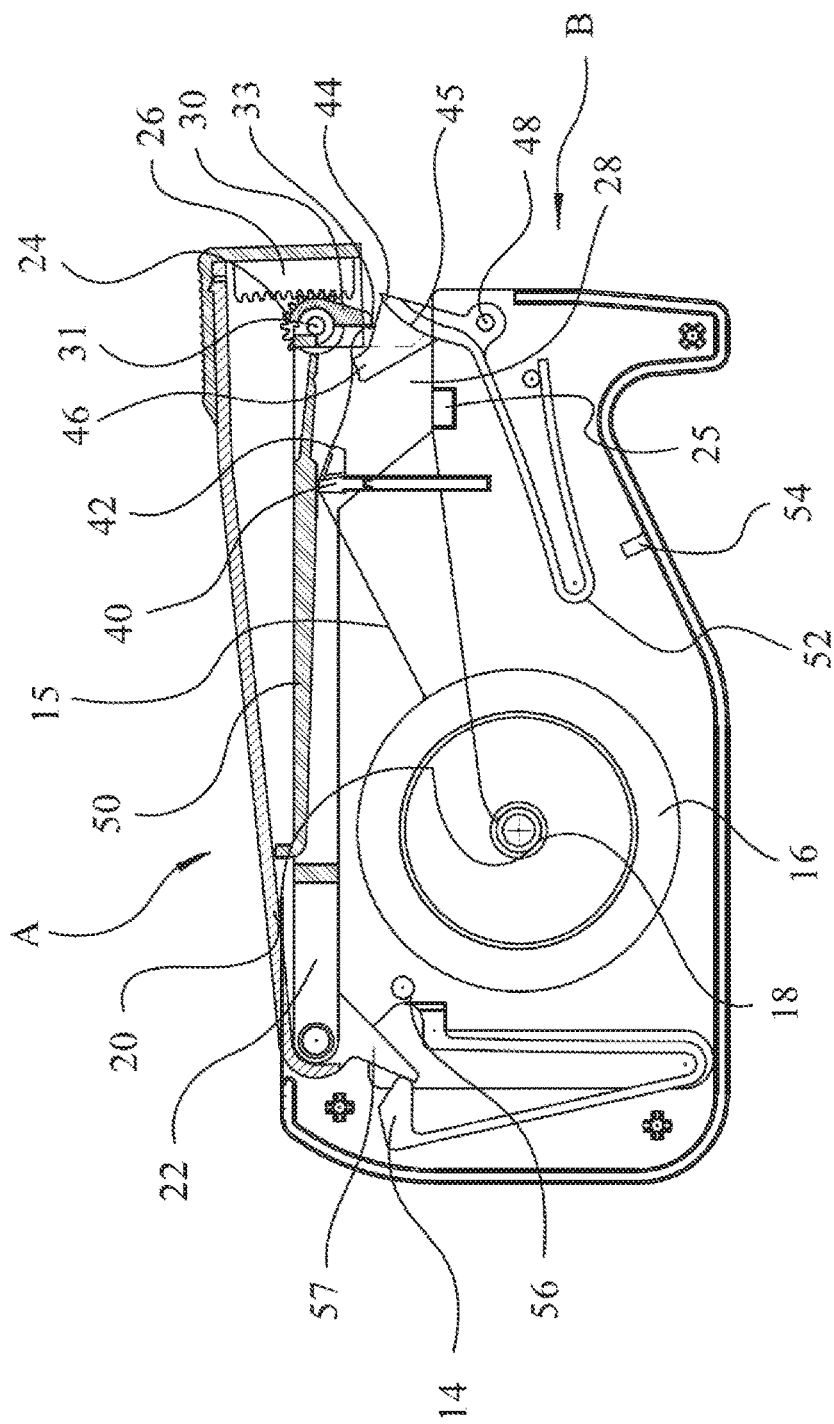
FIG. 5 illustrates a further cross-sectional side view of a tab-forming apparatus for adhesive-backed products wherein an adhesive-backed product is engaged by a folding assembly and has begun to form a tab in an embodiment of the present invention.

The folding hinge pinion gear 24 may be rigidly affixed to the folding hinge 30, and the folding hinge 30 may further rotate down and rearward, toward the tape edge 34, as illustrated in FIGS. 4-6. A tape capture lip 33, shown in detail in FIG. 6a, which may be a protruding ridge of metal, plastic or other like material may be mounted at the leading edge of the folding hinge 30 across its width or partial width thereof. The tape capture lip 33 may be a solid edge that may hold the tape edge 34 in place as the folding hinge 30 rotates and folds the tape edge 34, as described below. An indent or nock 35 in a lower arm assembly leaf spring 50 or other mating surface corresponding in position to the tape capture lip 33 may provide a hollow for the tape capture lip 33 to fit into as the tab-forming process takes place.

As the cutter displacement cam 28 pushes the cutter 44 out of the way, as described above, the tape positioning finger 46 may be lifted concurrently due to the non-uniform cantilevered behavior of the cutter 44. The tape positioning finger 46 improves the predictability of the position of the tape edge 34 so that the tape edge may be reliably captured by the tape capture lip 33, as illustrated in FIGS. 5-6. Specifically, given the distance between the tape anvil 40, the tape guide anvil 42 and cutter 44, in order to prevent the tape 15 from leaving its proper position, it may be helpful for the tape positioning finger 46 to lift and/or position the tape 15 for proper presentation to the folding mechanism. Moreover, the slope of the tape positioning finger 46 may cause the tape to be pushed upwardly, facilitating engagement by the folding hinge 30 and specifically by the tape capture lip 33. As shown in FIG. 1, a slot 58 may be disposed within the folding hinge 30 through a portion of its lateral profile to provide clearance for the tape positioning finger 46 as the folding hinge 30 rotates. FIGS. 6 and 6a illustrate a cross-sectional view of the tape positioning finger 46 traversing through the slot 58 within the folding hinge 30 as the folding hinge 30 rotates to form the tab, as described herein.

As the tape edge 34 is pushed over the tip of the tape positioning finger 46, the tape edge 34 may be allowed to slide against corrugations or other like shape, such as a sawtooth shape, compressible surface, or the like, that may be provided in the folding hinge 30 and slip into the tape capture lip 33 thereby forming a loop 37 in the tape 15, as illustrated in FIG. 6a. Mating corrugations, or other like shape, such as the aforementioned sawtooth shape, compressible surface or the like, may further be provided in the lower arm assembly leaf spring 50 such that when the folding hinge 30 compresses the loop 37 formed in the tape edge 34 to form the tab 60, as illustrated in FIGS. 6a and 7a, the mating corrugations may enhance the reliability of the tape being stuck against itself to form the tab 60, due to the meshing of the corrugations or like surfaces together when compressed against each other, as further shown in FIGS. 6-7. Preferably, as the folding hinge rotates and folds the tape edge 34, the lower arm assembly leaf spring 50 may flex upwardly by the pressure of the folding hinge 30 assuring that that all of the corrugations mate and press the two surfaces of the tape 15 together. It should be noted that instead of a lower arm assembly leaf spring 50, a non-flexing surface may be provided to ensure that the corrugations mate and press the two surfaces of the tape 15 together.

The Fold

It is important to note that the imposed curve of the tape edge 34 along its longitudinal axis may create a momentary bias in the tape substrate and may cause it to fold downward. This fold may thus become a loop that folds upon itself and ultimately forms the tab 60, as illustrated in FIG. 7a. At the point where the folding hinge 30 presses the fold into the tab 60, there may be, in place of or in addition to the corrugations, a folding hinge compression strip (not shown), which may be comprised of a relatively thin, dense compressible material, such as rubber or a tape and may include a thick, cushiony substrate. In a preferred embodiment, the folding hinge compression strip may be flexible, yet have resiliency. As the rotary motion of the folding hinge 30 may continue through to the end of its cycle, the folding hinge compression strip may provide a cushioned pressure across a final segment of the tape edge 34. The folding hinge 30, after forming the resulting tab 60, may reach the hard end of its travel at the bottom (now ceiling) of the lower arm 22 or equivalent mating surface.

The Reset

In mid-cycle, there may be mechanical stops that may be positioned at various locations to prevent the mechanisms from over-extending, such as stop 56 to prevent the folding assembly A from overextending when biased away from the tape and cutter assembly B. However, to control the resting position of the apparatus between cycles, the folding assembly A and the tape and cutter assembly B may preferably separate to return to the wide-open position. This may be accomplished by the spring 14, the tension of which may be increased when the apparatus is closed and released upon opening the same, as illustrated in FIG. 3-7.

It should be noted that the position of parts disclosed herein may form a uniform tab across the edge 34 of the tape. However, alternative tabs may be formed in the tape's leading edge by changing relative positions of certain parts described herein. For example, for certain applications, only a corner of the leading edge of the tape may form the tab, such as if the tab-forming mechanism is offset at an angle to the tape's leading edge.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An apparatus for forming a tab on an adhesive-backed strip comprising:
   a base housing and an upper arm assembly comprising a moving tab-forming element, the base housing having a first guide for positioning an adhesive-backed strip in proximity to the moving tab-forming element, wherein movement of the upper arm assembly towards the base housing causes the tab-forming element to move, wherein movement of the tab-forming element causes an end of the adhesive-backed strip to seal upon itself to form a tab on the adhesive-backed strip,
   wherein the upper arm assembly is hingedly connected to the base housing and biased away from the base housing via a spring,
   wherein the upper arm assembly comprises a first arm and a second arm, the first arm hingedly connected to the second arm on first ends of the first arm and the second arm, whereby moving the second arm relative to the first arm at the second ends of the first arm and the second arm causes the moving tab-forming element to rotate.

2. The apparatus of claim 1 wherein the first arm comprises a gear segment and the second arm comprises a gear, wherein moving the first arm relative to the second arm at the second ends of the first arm and the second arm causes the tab-forming element to rotate.

3. The apparatus of claim 2 wherein the gear segment is a rack and the gear is a pinion gear.

4. The apparatus of claim 1 wherein the second arm is biased away from the first arm.

5. The apparatus of claim 1 wherein the second arm is biased away from the first arm via a spring.

6. The apparatus of claim 1 further comprising:
a cutter assembly comprising a cutter for cutting the adhesive-backed strip after forming the tab in the adhesive-backed strip with the moving tab-forming element.

7. The apparatus of claim 6 further comprising:
a second guide comprising an adhesive-backed strip engagement surface, wherein the second guide extends from the first guide; and
a third guide comprising a second adhesive-backed strip engagement surface, wherein the third guide extends from the cutter assembly.

8. The apparatus of claim 6 further comprising:
a second guide extending from the cutter assembly, wherein the second guide comprises an adhesive-backed strip engagement surface wherein the second guide holds the adhesive-backed strip in a position,
wherein movement of the cutter assembly causes the second guide to move, wherein movement of the second guide causes the adhesive-backed strip to move into the position for forming a tab via the moving tab-forming element.

9. The apparatus of claim 6 wherein the cutter assembly has a first position and a second position, wherein the cutter assembly is biased from the second position to the first position.

10. The apparatus of claim 1 further comprising:
a cutter assembly comprising a cutter for cutting the adhesive-backed strip after forming the tab in the adhesive-backed strip with the moving tab-forming element,
wherein the assembly comprises a cam and the base housing comprises a cam surface connected to the cutter assembly, wherein movement of the upper arm assembly toward the base housing causes the cam to engage the cam surface, causing movement of the cutter assembly.

11. The apparatus of claim 10 wherein the cutter is rotatably connected to the base housing, wherein engagement of the cam with the cam surface causes displacement of the cutter.

12. The apparatus of claim 1 further comprising:
a second guide comprising a second adhesive-backed strip engagement surface, wherein the first guide and the second guide hold the adhesive-backed strip in the position.

13. The apparatus of claim 12 wherein the second guide is proximal to the first guide.

14. The apparatus of claim 12 wherein the second guide is a lifting guide that extends from the cutter.

15. The apparatus of claim 1 further comprising:
a second guide comprising a second adhesive-backed strip engagement surface, and a third guide comprising a third adhesive-backed strip engagement surface.

16. The apparatus of claim 1 wherein the moving tab-forming element comprises a lip for catching a leading edge of the adhesive-backed strip.

17. The apparatus of claim 16 further comprising:
a tab-closing surface such that the moving tab-forming element contacts the tab-closing surface when the moving tab-forming element moves.

18. The apparatus of claim 1 wherein the first guide comprises a roller mechanism comprising a first rotating cylinder having a concave surface, wherein the adhesive-backed strip runs on an underside of the first rotating cylinder thereby introducing the lateral concave-downward curve in the adhesive-backed strip.

19. The apparatus of claim 1 wherein the first guide comprises a roller mechanism comprising a first rotating cylinder having a convex surface, wherein the adhesive-backed strip runs over a top of the first rotating cylinder thereby introducing the lateral concave-downward curve in the adhesive-backed strip.

20. The apparatus of claim 18 further comprising a second rotating cylinder comprising a convex surface, wherein the first rotating cylinder is disposed adjacent the second rotating cylinder and configured for the adhesive-backed strip to run between the first rotating cylinder and the second rotating cylinder, wherein the concave surface of the first rotating cylinder and the convex surface of the second rotating cylinder are configured to introduce the lateral concave-downward curve in the adhesive-backed strip.

21. The apparatus of claim 1 wherein the first guide comprises a base element having a first curved side guide and a second curved side guide, wherein the first curved side guide and the second curved side guide are on opposite sides of the base, wherein the first guide is configured to have the adhesive-backed strip run therethrough, and further wherein the first guide is configured to introduce a lateral concave-downward curve in the adhesive-backed strip.

22. A method of forming a tab on an adhesive-backed strip comprising:
providing an apparatus for forming a tab on an adhesive-backed strip comprising a base housing and an upper arm assembly comprising a moving tab-forming element, the base housing having a first guide for positioning an adhesive-backed strip in proximity to the moving tab-forming element, wherein movement of the upper arm assembly towards the base housing causes the tab-forming element to move, wherein movement of the tab-forming element causes an end of the adhesive-backed strip to seal upon itself to form a tab on the adhesive-backed strip, wherein the upper arm assembly is hingedly connected to the base housing and biased away from the base housing via a spring, wherein the upper arm assembly comprises a first arm and a second arm, the first arm hingedly connected to the second arm on first ends of the first arm and the second arm, whereby moving the second arm relative to the first arm at the second ends of the first arm and the second arm causes the moving tab-forming element to rotate;
providing the adhesive-backed strip extending from the housing, wherein the adhesive-backed strip has a leading edge, the adhesive-backed strip further having a portion immediately adjacent to the leading edge;
engaging the leading edge of the adhesive-backed strip with the tab-forming element; and
moving the tab-forming element to form a tab in the adhesive-backed strip by forming a loop formed by positioning the leading edge of the adhesive-backed strip under the portion of the adhesive-backed strip immediately adjacent to the leading edge thereof and sealing the leading edge of the adhesive-backed strip against itself to the portion immediately adjacent to the leading edge thereof to form the tab in the adhesive-backed strip.

23. The method of claim 22 further comprising:
a first guide configured to position the adhesive-backed strip.

24. The method of claim 23 wherein the first guide comprises an adhesive-backed strip engagement surface, the method further comprising the step of:

engaging the adhesive-backed strip with the engagement surface of the first guide thereby holding the adhesive-backed strip in a position prior to engaging the leading edge of the adhesive-backed strip with the tab-forming element.

25. The method of claim 23 wherein the first guide comprises a roller mechanism comprising a rotating cylinder having a concave surface, the method comprising the steps of:
running the adhesive-backed strip on an underside of the rotating cylinder; and
introducing a lateral concave-downward curve in the adhesive-backed strip to aid in the formation of the tab in the adhesive-backed material by the tab-forming element.

26. The method of claim 23 wherein the first guide comprises a roller mechanism comprising a rotating cylinder having a convex surface, the method comprising the steps of:
running the adhesive-backed strip on the convex surface on a top of the rotating cylinder; and
introducing a lateral concave-downward curve in the adhesive-backed strip.

27. The method of claim 23 wherein the first guide comprises a roller mechanism comprising a first rotating cylinder having a concave surface and a second rotating cylinder comprising a convex surface, wherein the first rotating cylinder is disposed adjacent the second rotating cylinder;
running the adhesive-backed strip between the first rotating cylinder and the second rotating cylinder; and
introducing a lateral concave-downward curve in the adhesive-backed strip.

28. The method of claim 23 wherein the first guide comprises a base element having a first curved side guide and a second curved side guide, wherein the first curved side guide and the second curved side guide are on opposite sides of the base element, the method further comprising the steps of:
running the adhesive-backed strip through the first guide between the first and second curved side guides, wherein the distance between the first curved side guide and the second curved side guide is narrower than the width of the adhesive-backed strip; and
introducing a lateral concave-downward curve in the adhesive-backed strip.

* * * * *